Feb. 11, 1964

S. A. McMEANS 3,120,735

TELEPHONE TIMER

Filed Dec. 17, 1962

INVENTOR.
SIDNEY A. McMEANS
BY
[signature]
Attorney

United States Patent Office 3,120,735

Patented Feb. 11, 1964

3,120,735

TELEPHONE TIMER

Sidney A. McMeans, 859 Nantucket, Eugene, Oreg.

Filed Dec. 17, 1962, Ser. No. 244,995

1 Claim. (Cl. 58—144)

This invention relates to a device to be attached to a telephone for timing the duration of calls.

Long distance calls are generally charged at a basic rate for an initial interval such as three minutes. Beyond that time a further charge is made for each additional minute. Very often a conversation is terminated prematurely because the caller does not have available any convenient means for measuring the three minute interval. In other cases an additional charge is incurred unnecessarily because the caller underestimates the duration of his conversation and inadvertently exceeds the three minute interval when the extra time is not actually required for the business to be transacted. It is inconvenient to keep account of the passage of time during a conversation by means of an ordinary watch or clock whereby some more convenient time measuring device is desirable.

It is, therefore, the general object of the present invention to provide a time measuring device for the purpose described which may be attached directly to the telephone for the convenience of the user in timing his calls. Other objects are to provide a resettable timing device which will operate for the interval covered by the basic charge for a long distance call, to provide a convenient mounting clip for such a timing device for attachment to a telephone, to adapt an hour-glass type of timer for telephone use and to provide a device of the type described of extremely simple construction which is economical to manufacture.

The present timer comprises a miniature hourglass having rotatable trunnion mounting on a clip which is adapted for attachment to the base of a telephone instrument. The hourglass comprises a sand tube which may be turned on its trunnion mounting to start a timing operation when the telephone conversation is initiated. The falling of the sand may be observed in a casual manner by the user without as much distraction to his conversation as is required to watch the movement of the hand of a watch or clock and remember the time when the conversation started. By watching the progress of the sand, the caller can terminate his conversation in time to keep the call within the interval allowed under the basic charge.

The invention will be better understood and additional objects and advantages will become apparent from the following description of the preferred embodiment illustrated on the accompanying drawings. Various changes may be made, however, in the details of construction and arrangement of parts and all such modifications within the scope of the appended claim are included in the invention.

Figure 1:
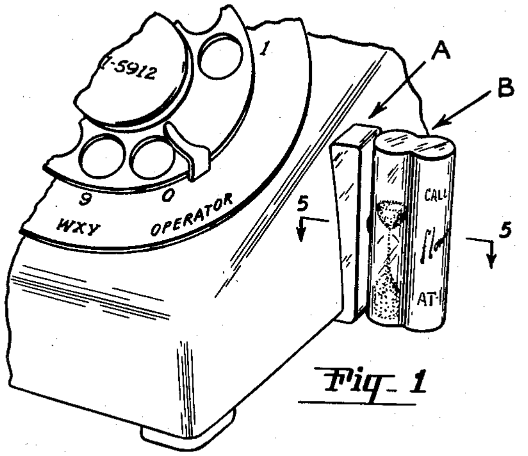
FIGURE 1 is a fragmentary perspective view of a telephone instrument showing the present timer mounted theron.
Figure 3:
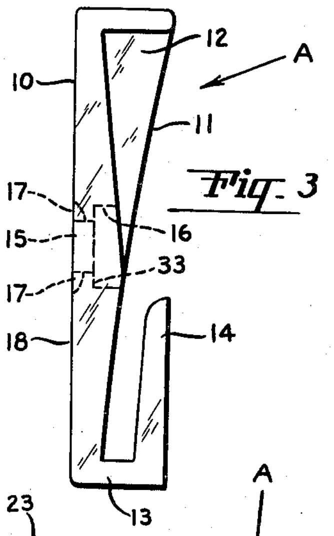
FIGURE 3 is a side elevation view of the base clip.

The device comprises essentially a mounting clip A and a rotatable sand tube unit B. These parts may be made of any suitable material, a transparent moldable plastic being preferred.

Mounting clip A has a relatively rigid upstanding base leg 10 with a rear face 11 adapted to bear against one side wall of the telephone instrument as shown. Portions of this leg may be cut away or relieved as at 12 for economy of material and to reduce the weight of the clip. The lower end of leg 10 has formed thereon a hook portion 13 with an upstanding clamping finger 14 spaced from the telephone engaging surface 11. The thickness of these portions of the device is adjusted to provide a certain amount of flexibility and resilience so that the finger 14 will grip the inside of the telephone casing and clamp the base leg 10 against the outside surface thereof in vertical position. Most telephones are constructed so that the finger 14 may be readily inserted behind the bottom edge of the telephone casing as shown. This form of attachment is not objectionable because it does not damage or mar the telephone nor interfere with its operation in any way. The mounting clip may be readily attached and removed as desired, without the use of tools.

The mid-portion of leg 10 is formed with a cylindrical bore 15 having an enlargement or counterbore 16 at its inner end. On opposite upper and lower sides of bore 15 there are rounded recesses 17 communicating with the bore and opening through the front face 18 of the leg.

The sand tube unit indicated generally by the character B includes a sand tube 20 and an adjoining tube 21 to contain advertising material 22. Tube 21 is closed at its lower end by an integral bottom wall and the advertising material is preferably sealed permanently in this tube by means of a plug 23 which is fused in the open top end.

The sand tube unit B is mounted for rotation in bore 15 by means of a trunnion 25 which is molded as an integral projection on the side of sand tube 20 opposite the tube 21. At the junction of trunnion 25 with the surface of tube 20 there are a pair of upper and lower small rounded projections 26 which are adapted to seat in the depressions 17 when the tube is in vertical position.

The two parts A and B are held in assembled relation by a compression coil spring 30 having a diametrally directed end portion 31 which is inserted in a transverse hole 32 in the outer end of trunnion 25. End portion 31 of the spring serves as a cotter key while the spiral convolutions surround the trunnion and resiliently hold the projections 26 seated in depressions 17. The opposite end of the spring bears against shoulder 33 at the bottom of the counterbore. The inner end of counterbore 16 is preferably closed by a cup-shaped metal cap 35 having a rim flange which is pressed fitted into the counterbore.

Figures 2, 4, 5:
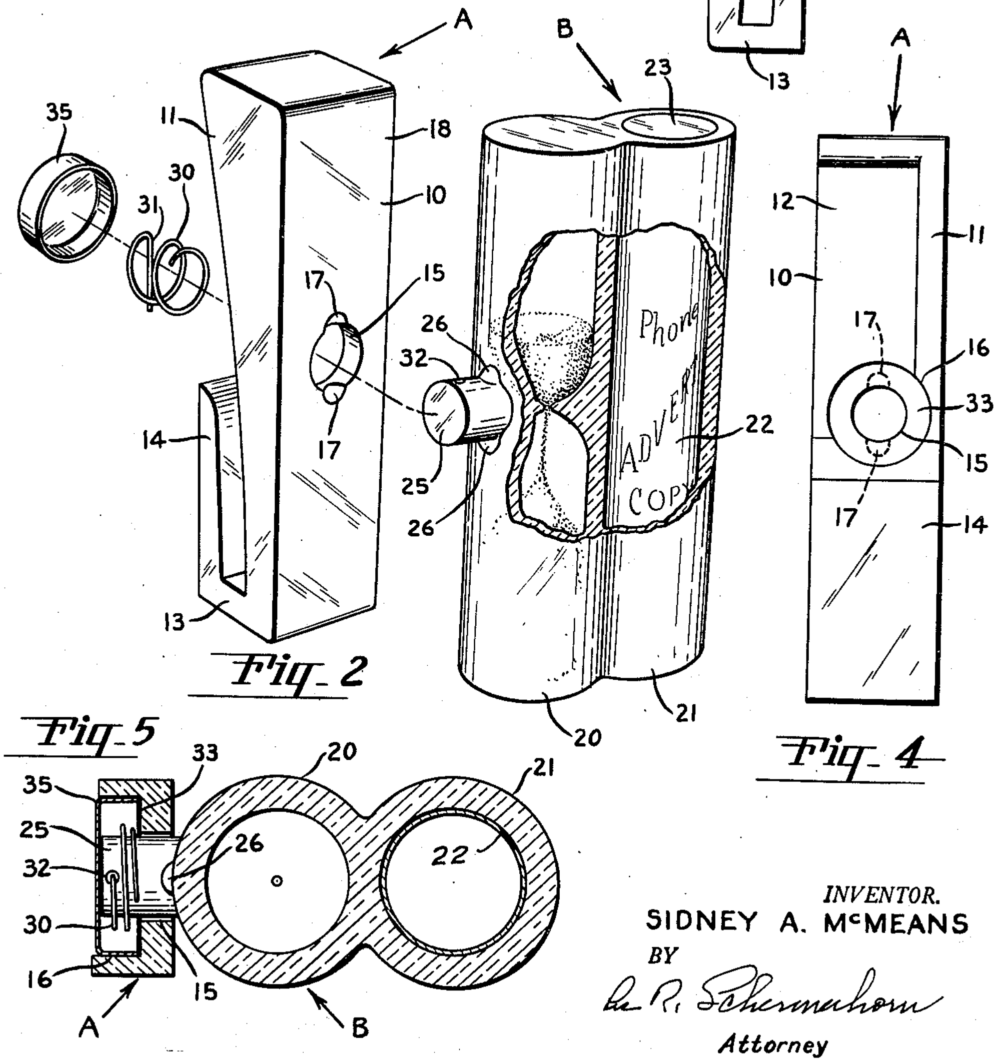
FIGURE 2 is an enlarged and exploded perspective view of the timer.
FIGURE 4 is an elevation view of the base clip taken at right angles to the view in FIGURE 3.
FIGURE 5 is a cross sectional view taken on the line 5—5 of FIGURE 1.

When connections are completed for a long distance call, the caller rotates sand tube unit B 180° in either direction to invert this unit and start the timing interval. When the unit B is thus turned, the projections 26 readily cam themselves out of depressions 17 and ride on the smooth back surface 18 of the leg 10. This operation pulls the trunnion 25 to the right in FIGURE 5, compressing the spring 30. After 180° of rotation, the projections 26 snap back into depressions 17 to index the sand tube in vertical position. If it is decided not to terminate the call by the time the sand has flowed from the upper chamber to the lower chamber of the sand tube, the latter may be inverted again by turning it on its trunnion to measure a second interval.

For timing purposes a colored sand may be used, or a suitable colored liquid or colored chemical material in solid state, as well as plain white sand. The term "sand tube" includes all such materials which are suitable for this purpose.

The provision of space for advertising material makes the device particularly attractive as a premium or gift for advertising purposes. Being mounted on the telephone the advertising is always in sight whenever a person is near the phone. Moreover, when long distance calls are made, the eyes of the caller are of necessity directed toward the device whereby the advertising will make an unconscious, if not a conscious, impression on the user by repeated exposure to its message.

Having now described my invention and in what manner the same may be used, what I claim as new and desire to protect by Letters Patent is:

A telephone timer comprising a mounting clip having a base leg and a resilient clamping finger on one side thereof, a transverse bore through the mid-portion of said base leg having an enlarged counterbore on said one side of said base leg, a pair of rounded depressions intersecting opposite sides of said first bore on the opposite side of said base leg, an hourglass sand tube having a transverse trunnion on one side thereof disposed in said bores, a pair of rounded projections on opposite sides of the base portion of said trunnion adapted to seat in said depressions, the outer end of said trunnion having a transverse hole therein, a spiral compression spring in said counterbore and surrounding said trunnion, and a diametral end portion on said spring disposed in said hole.

References Cited in the file of this patent

UNITED STATES PATENTS

| | | |
|---|---|---|
| 1,245,923 | Jarmin | Nov. 6, 1917 |
| 1,260,979 | Jarmin | Mar. 26, 1918 |
| 1,694,059 | Denny | Dec. 4, 1928 |
| 2,078,603 | Felstein et al. | Apr. 27, 1937 |
| 2,684,152 | Schweiger | July 20, 1954 |
| 2,941,350 | Regovin | June 21, 1960 |